2,894,999

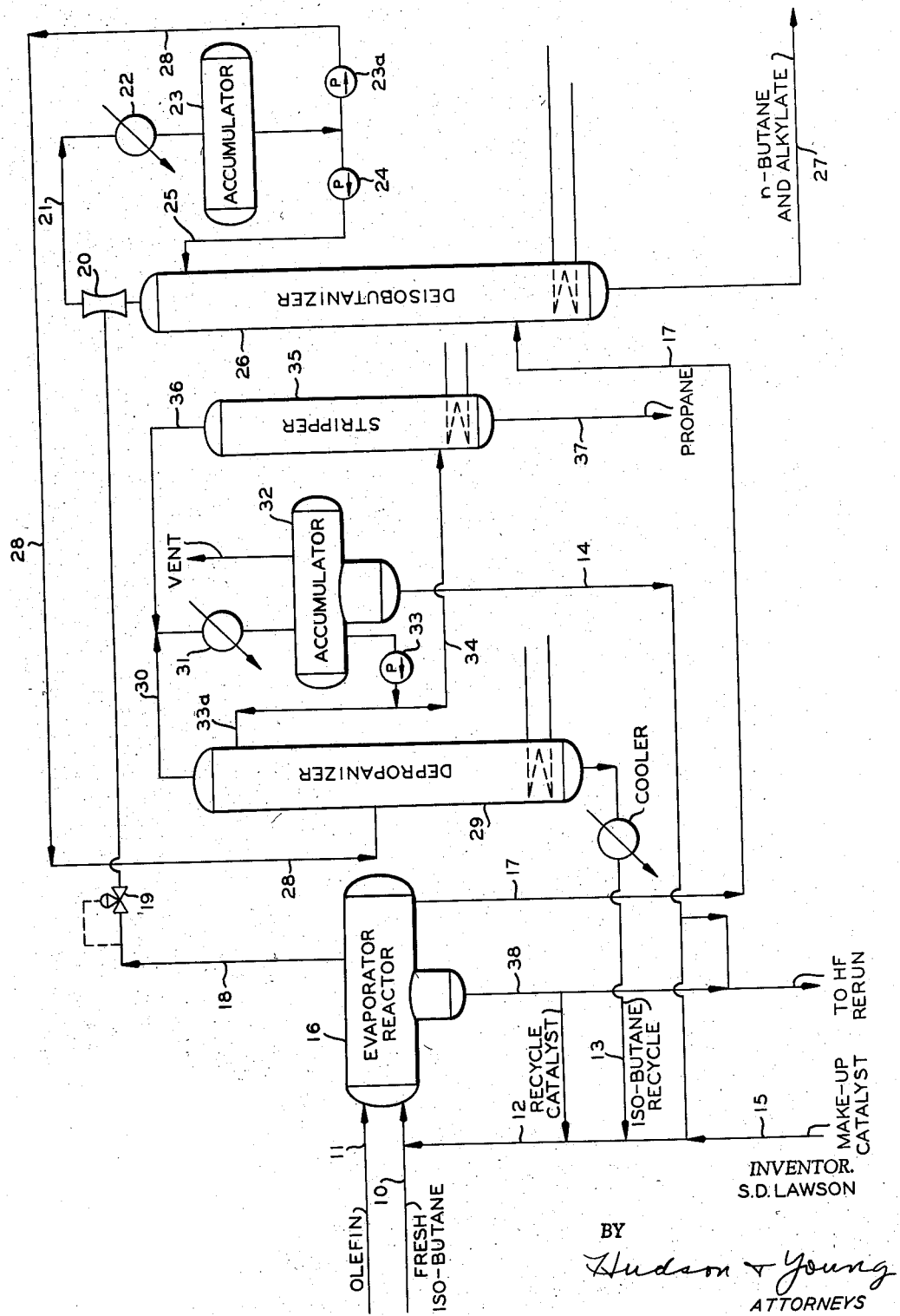

ALKYLATION OF HYDROCARBONS, WITH EVAPORATIVE COOLING

Shelby D. Lawson, Bartlesville, Okla., assignor to Phillips Petroleum Company, a corporation of Delaware Application May 23, 1957, Serial No. 661,241

9 Claims. (Cl. 260—683.48)

This invention relates to alkylation. In one of its aspects, the invention relates to an alkylation of hydrocarbons wherein at least some of the excess light hydrocarbon is evaporated from the alkylation contactor or reactor, so as to cause a cooling of the exothermic alkylation reaction occurring therein, by creating a pressure reduction in said reactor employing as source of suction a pressure-reducing zone actuated by the same or similar light hydrocarbons being recovered as a higher pressure stream from a fractionation zone also employed in the process. In a specific embodiment of the invention, a suction is created upon an evaporator reactor zone, in which an isoparaffin, say, isobutane, is being alkylated by an olefin, say, butylene, in the presence of a catalyst by connecting said zone to a pressure-reducing zone which is operatively connected to the vapor outlet of a deisobutanizing zone which is operated at a pressure substantially higher than that prevailing in said evaporator reactor zone and passing the combined light hydrocarbon vapors thus obtained to a depropanizer zone wherein any propane is separated to yield recycle isobutane which is recycled to the reaction.

In the alkylation of organic compounds as in the alkylation of an excess of an alkylatable compound or hydrocarbon, e.g., an isoparaffin, a naphthene or an aromatic, with an alkylating compound such as an olefin or an olefin yielding compound, in the presence of a catalyst such as hydrofluoric, sulfuric and other acids, the reaction is exothermic and best or optimum results are obtained at controlled temperatures which are maintained by refrigeration or cooling, to obtain a suitable cooling without interfering with the attainment of optimum results, both in terms of efficiency of operation and quality of product, has been a continuing problem facing those skilled in the art. As a result, various methods or operations have been set forth each in its own way seeking to completely provide the optimum operation. However, at this writing, it is not possible to state that any one of the several methods set forth in the art is the best but it is possible to state that there is room for improvement, especially in the economies and efficiencies of heat transfer as well as in the cost and general arrangement of apparatus required to accomplish neatly an improved alkylation requiring a reduced number of steps and/or reduced cost of equipment and possessing also, and very importantly, the advantages of maintaining at all stages purities of streams which have already been obtained, to avoid multiple treatments or losing a benefit already obtained in the operation and/or to take advantage of certain energies already extant in the operation, for example, a stream under a pressure higher than that prevailing advantageously in the alkylation reaction zone.

It has been proposed in the prior art to cool the reactor contents in an alkylation of an isoparaffin with an olefin by vaporizing a portion of the excess isoparaffin supplied to the reactor. Withdrawn vapors are compressed, cooled and condensed and returned to the reactor. Also proposed has been the withdrawal of vapors from the hydrocarbon phase obtained in the settler of such an alkylation by passing said hydrocarbon phase to an evaporative cooler from which vapors are withdrawn by means of compressors providing a remaining cooled liquid which is passed into indirect heat exchange with a stream flowing to the contactor. Vapors obtained are compressed, cooled, condensed and charged to the recycle surge tank, ultimately being recycled to the contactor. It is also known to circulate the reactor contents into indirect heat exchange relationship with separated liquid hydrocarbon phase undergoing evaporation, the vapors obtained being admixed with substantially pure recycle hydrocarbon vapors and ultimately recycled to the contactor or contactors. Further proposed has been the evaporative chilling of a hydrocarbon phase from the alkylation effluent settler in an alkylation of an isoparaffin with olefin, i.e., isobutane with olefin, by removing vapors therefrom, passing acid catalyst being charged to the reactor into indirect heat exchange with the chilled liquid hydrocarbons and then passing the cooled acid into chilling heat exchange with liquid propane causing evaporation thereof and further cooling of the acid. The propane vapors are compressed, cooled and condensed and returned to the chiller. A bleed stream of propane is returned to fractionation for cleanup. Also, the vapors obtained from the evaporative chilling, in the proposed process being described, are admixed with the isobutane recycle obtained from the fractionating zone.

An object of this invention is to provide an improved method and apparatus for the alkylation of an alkylatable compound with an alkylating compound. Another object of the invention is the provision of a source of cooling for an alkylation reaction.

A further object of the invention is the provision of an alkylation operation, wherein use is made of the energy of a stream of vapors at a pressure necessarily higher than that in the reaction zone to cool said zone. Another object is the provision of a process for the alkylation of hydrocarbons wherein the reaction is cooled employing the energy of a stream of hydrocarbons obtained from the reaction effluent at a pressure higher than that prevailing in the reactor. Still, a further object is the avoidance of contamination of recycle hydrocarbon or alkylatable compound with inerts or other preferably eliminated materials, as will be apparent from a final study of this specification.

Other aspects, objects and the several advantages of the invention are apparent from this description, the drawing and the appended claims.

It has occurred to me that the prior art proposed alkylation processes, in which cooling of the reaction is necessary to avoid obtaining of inferior results due to polymerization, cracking, degradation, etc., possess certain features which can be considered the subject of improvement. I effect certain improvements by employing for the cooling of the alkylation reaction zone evaporation of lighter components of the reaction mass therein caused by suction on said zone created by connecting said zone to a pressure-reducing zone actuated by the same or similar excess lighter component being recovered as a higher pressure stream from a fractionating zone also employed in the process.

Since the invention is conceived in connection with the alkylation of hydrocarbons, as in the alkylation of an excess of an isoparaffin with an olefin, it will be more fully set forth and described in greater detail in connection with the alkylation of isobutane with a butylene feed which usually contains some propylene. It will be understood that the modus operandi here set forth is applicable to other alkylations which are known in the alkylation art, in which there are recovered and recycled, following treatment, alkylating compounds initially present in the alkylation zone in excess, for reasons known to the art. Specifically, I have conceived that the deisobutanizer overhead, obtained in the zone in which the reaction effluent is deisobutanized, is an ideal motive force for the operation of a suction-creating means, such as a venturi, for creating a suction upon the alkylation reaction zone. It will be observed that vapors coming from the alkylation reaction zone are composed essentially of the excess isobutane or other alkylatable compound as is the deisobutanizer overhead. Thus, when admixture of the vapors from the reaction vessel and the deisobutanizer occurs, there is involved no loss of purity or the mixing of an undesirable material with a desirable material.

Thus, according to this invention, there are provided a method and an apparatus wherein an excess of an alkylatable compound is alkylated in the presence of a catalyst by an alkylating compound in an exothermic reaction requiring cooling, the alkylation zone effluent is treated to recover excess alkylatable compound, the excess alkylatable compound is used as motive fluid for a suction-creating zone, and the alkylation reaction is cooled, evaporatively, by creating a suction on the alkylation zone employing said suction-creating zone.

In terms of the specific embodiment in connection with which this invention is now more fully described, an isobutane stream obtained from a conventional deisobutanizer in which the hydrocarbon phase from an alkylation zone is deisobutanized is passed through a suction-creating zone or venturi which is operatively connected to create a suction on said alkylation zone to cause evaporation therefrom of a portion of the excess of isobutane which is maintained therein.

Referring now to the drawing, there is described a specific embodiment according to the invention in which fresh isobutane is passed by pipe 10, together with an olefin stream composed essentially of butylene and propylene entering by pipe 11 and hydrofluoric acid catalyst from pipe 12 into evaporative reactor 16. In this reactor, there is accomplished an exothermic alkylation reaction in which isobutane is alkylated with the olefin. There is also formed normal butane in addition to that which is ordinarily contained in minor quantity in the isobutane stream. Still further, there is formed propane. Reactor 16 is cooled by sucking therefrom some of the excess isobutane along with propane by way of pipe 18 on which there is mounted a back pressure control valve 19. Used acid is separated in the bottom of reactor 16 and returned to pipe 12 by way of pipe 38. An alkylation effluent hydrocarbon stream is passed by way of pipe 17 to deisobutanizer 26. In deisobutanizer 26, the alkylation effluent hydrocarbon stream is separated into normal butane and alkylate which are removed at the bottom by way of pipe 27 for further fractionation or separation, not shown. The overhead from the deisobutanizer is passed by way of venturi 20, pipe 21, and condenser 22 to accumulator 23 from which a portion is returned by way of pump 24 and pipe 25 as reflux to deisobutanizer 26. Yield quantities of isobutane are passed from accumulator 23 by way of pump 23a, pipe 28 to depropanizer 29. It will be noted that pipe 18 is connected to the throat of venturi 20, creating the suction which is operative to reduce the temperature in evaporator reactor 16 and to maintain it at a desired value. The valve 19 is set so as to maintain a predetermined pressure in reactor 16. Returning now to depropanizer 29, there is obtained as bottoms isobutane which is recycled by way of pipe 13 and pipe 12 to reactor 16. Overhead from depropanizer 29 is passed by way of pipe 30, condenser 31 into accumulator 32 from which a portion of the hydrocarbon phase which separates therein is passed by way of pump 33 and pipe 33a to depropanizer 29 as reflux therefor. It will be noted that, since the hydrocarbon phase from reactor 16 is passed directly by way of pipe 17 to the deisobutanizer 26, the isobutane overhead from deisobutanizer 26 will contain propane and some hydrogen fluoride. This hydrogen fluoride settles in the bottom of accumulator 32 and is returned for reuse by way of pipe 14 and pipe 12 to reactor 16. Some of this hydrogen fluoride can be charged to a conventional acid rerun still which is not shown. Yield quantities of propane containing a trace of hydrogen fluoride are passed by way of pipe 34 to stripper 35 wherein propane bottoms taken therefrom by way of pipe 37 are stripped, passing overhead the hydrogen fluoride which travels by pipe 36 through condenser 31 into accumulator 32. The operation of the combination of depropanizer 29 and stripper 35 is described and claimed in Patent 2,773,920, issued December 11, 1956, on an application filed by L. H. Vautrain and Edward Strunk. In said patent, there is claimed in the alkylation of an isoparaffin with an olefin in the presence of hydrofluoric acid as a catalyst in which there is obtained an alkylation effluent containing desired alkylate product, gases lighter than propane, propane, isobutane, normal butane and hydrofluoric acid, the steps in combination comprising: fractionating a hydrocarbon phase obtained from said alkylation to obtain therefrom a fraction containing gases lighter than propane, some propane and an equilibrium proportion of hydrogen fluoride; placing said fraction under conditions to obtain liquid propane therefrom, which is removed as a product of the process, and a first gaseous phase containing propane, hydrogen fluoride, and gases lighter than propane; cooling said first gaseous phase to obtain therefrom a condensate of hydrocarbon and hydrogen fluoride and to form a second gaseous phase containing substantially only gases lighter than propane, removing said second gaseous phase from the process; separating said condensate into a hydrocarbon phase and a hydrogen fluoride phase and recovering said hydrogen fluoride. The combination of the depropanizer 29 and stripper 35 does not form a part of this invention, except as it is described in connection therewith.

The details of venturi or eductor 20 can be those of the eductors known in the art. Since there will be hydrofluoric acid or hydrogen fluoride present in the overhead from deisobutanizer 26, the materials of construction for eductor 20 will be those which preferably are highly resistant to the action of the acid.

It is particularly an advantage of this invention, as it is operated, that any propane in evaporator reactor 16 will be substantially removed by way of pipe 18 and passed by way of eductor 20, pipe 21, cooler 22, accumulator 23, pump 23a and pipe 28 directly to the depropanizer. Thus, in the modus operandi according to this invention, there is essentially no propane load on the deisobutanizer. This permits a savings in the design and construction of the deisobutanizer. Obviously, any slight amount of propane which is returned together with the reflux by way of pipe 25 will immediately leave the top of deisobutanizer 26.

It is obvious to one skilled in the art in possession of this disclosure that it has been written for the purpose of disclosing to the art the invention of the appended claims. Thus, the skilled in the art having read this disclosure will routinely supply the details of construction and operation which, in each case, will depend upon the specific objective to be accomplished. Therefore, the drawing is necessarily schematic in character and does not include such details as valves, heat exchangers, etc., except as these facilitate description of the invention. Therefore, inclusion of certain elements in the drawing does not necessarily mean that all such elements, which one skilled in the art would use in execution of the invention, have been shown.

In a specific example employing this process, the evaporator-reactor is operated at 39 p.s.i.a. and 78° F. The isobutane to olefin mol ratio is 8.4 to 1 and the volume ratio of catalyst (94.5 wt. percent HF) to hydrocarbon is 1 to 1. Each barrel of olefin reacts with 1.2 barrels of isoparaffin to produce 1.7 barrels of total alkylate. The olefin, isobutane recycle, and fresh isobutane are introduced at 90° F., after these streams are cooled to this temperature by indirect heat exchange with cooling water. Lower temperatures are not available due to cooling water limitations. The recycle catalyst is introduced at 78° F. It is further noted that in the deisobutanizer a fired reboiler is employed (not shown) which effects defluorination of the alkylate-normal butane bottoms effluent, and produced HF is ultimately recovered via line 14 and returned to the reaction zone.

*Specific Example*

Olefin feed (11):
  Barrels per day _____ 5,000
  Composition, B./D.:
    Propylene _____ 1,635
    Propane _____ 635
    Butylene _____ 1,660
    iso-Butane _____ 835
    n-Butane _____ 235
  Total olefin, B./D. _____ 3,295
  Temperature, ° F. _____ 90
Fresh iso-butane (10):
  Barrels per day _____ 3,249
  Composition, B./D.:
    Propane _____ 67
    iso-Butane _____ 3,115
    n-Butane _____ 67
  Total iso-butane, B./D. _____ 3,115
  Temperature, ° F. _____ 90
Recycle iso-butane (13):
  Barrels per day _____ 29,600
  Composition, B./D.:
    Propane _____ 300
    iso-Butane _____ 29,000
    n-Butane _____ 300
  Total iso-butane, B./D. _____ 29,000
  Temperature, ° F. _____ 90
Catalyst (14 and 38):
  Barrels per day _____ 37,850
  Wt. percent HF _____ 94.5
  Temperature, ° F. _____ 78
Evaporator-reactor (16):
  Pressure, p.s.i.a. _____ 39
  Temperature, ° F. _____ 78
  iC₄/olefin mol ratio _____ 8.4:1
  Cat./hydrocarbon vol. ratio ____ 1:1
  Alkylate (butane-free), B./D. __ 5,600
  Line (18), B./D. _____ 17,602
    Composition, B./D.:
      Propane _____ 1,002
      iso-Butane _____ 16,600
  Line (17), B./D. _____ 18,602
    Composition, B./D.:
      iso-Butane _____ 12,400
      n-Butane _____ 602
      Alkylate _____ 5,600
Deisobutanizer (26):
  Pressure, p.s.i.a. _____ 168
  Temperature, ° F. (overhead) __ 162
  Overhead field, M#/D _____ 2,450
Accumulator (23):
  Pressure, p.s.i.a. _____ 66
  Temp., ° F. _____ 90

Reasonable variation and modification are possible within the scope of the foregoing disclosure, drawing and the appended claims to the invention, the essence of which is that a recovered alkylatable compound stream at pressure higher than that prevailing in the alkylation zone is used as motive fluid for a pressure reducing zone which, in turn, is employed to create a suction with which to cause evaporative cooling of the alkylation reaction zone.

I claim:

1. A process for the alkylation of isobutane with an olefin stream containing a butylene and some propylene which comprises contacting an excess of said isobutane and said olefin substantially in liquid phase in presence of liquid hydrofluoric acid catalyst under alkylation conditions in an alkylation zone forming an alkylation effluent, by an exothermic reaction, settling said effluent forming a hydrocarbon phase and an acid phase, returning the acid phase for reuse, deisobutanizing the hydrocarbon phase forming a stream containing n-butane and alkylate which are removed for further treatment and a vaporous isobutane-containing stream, passing said isobutane-containing stream through a pressure-reducing zone as motive fluid therefor and connecting said pressure-reducing zone to said alkylation zone causing evaporation from said zone of a portion of the isobutane therein, thereby causing cooling of said zone.

2. A process for the alkylation of an alkylatable compound wherein an excess of said compound is alkylated in the presence of a liquid catalyst, substantially in liquid phase, with an alkylating compound under alkylating conditions in an alkylation zone and by an exothermic reaction, requiring cooling to obtain optimum results which comprises performing said alkylation, forming an alkylation effluent containing an alkylate, excess alkylatable compound and catalyst, separating from said effluent as a vapor excess alkylatable compound, passing said vapor through a pressure-reducing zone as motive fluid therefor and connecting said pressure-reducing zone to said alkylation zone causing evaporation from said zone of a portion of the excess alkylatable compound therein, thereby causing cooling of said zone.

3. A process for the alkylation of an alkylatable hydrocarbon which comprises in an alkylation zone contacting an excess of said alkylatable hydrocarbon in liquid phase with an alkylating hydrocarbon in the presence of a catalyst under alkylating conditions, performing an exothermic alkylation reaction requiring cooling to obtain optimum results, obtaining alkylation effluent, recovering from said alkylation effluent substantially all of said excess alkylatable hydrocarbon still contained therein, passing said excess alkylatable hydrocarbon through a pressure-reducing zone as motive fluid therefor and connecting said pressure-reducing zone to said alkylation zone causing evaporation from said zone of a portion of the excess alkylatable hydrocarbon therein, thereby causing cooling of said zone.

4. A process according to claim 3 wherein the alkylatable hydrocarbon is selected from the group consisting of the isoparaffin, aromatic and naphthenic hydrocarbons and the alkylating hydrocarbon is an olefin.

5. A process according to claim 3 wherein the alkylatable hydrocarbon is isobutane and the alkylating hydrocarbon is butylene containing some propylene.

6. A process according to claim 5 wherein in the alkylation zone there are obtained a catalyst phase and a hydrocarbon phase, the hydrocarbon phase is deisobutanized obtaining an n-butane and alkylate-containing stream, which is removed from the process, and an overhead vaporous stream containing isobutane and propane, said vaporous stream is passed into and through an eductor zone as motive fluid therefor, and wherein the alkylation zone is connected to said eductor zone causing evaporation of excess alkylatable hydrocarbon therefrom, thus cooling the same.

7. A process according to claim 6 wherein the admixture of vapors from the alkylation zone and the eductor zone which is obtained is passed to a depropanizing zone and is therein depropanized yielding an isobutane recycle stream and wherein said isobutane recycle stream is recycled to said alkylation zone.

8. An apparatus suited to the alkylation of an alkylatable hydrocarbon with an alkylating hydrocarbon in presence of an acid catalyst under cooling conditions comprising in combination an evaporator reactor, means for supplying to said reactor alkylatable and alkylating hydrocarbons and acid catalyst, means for removing acid from said reactor, means for removing vapors from said reactor, means for fractionating alkylation effluent, means for passing effluent from said reactor to said means for fractionating alkylation effluent, means for taking vaporous alkylatable hydrocarbon from said means for fractionating alkylation effluent, an eductor connected to said means for taking vaporous alkylatable hydrocarbon from said means for fractionating and means connecting said means for removing vapors from said reactor to said eductor.

9. An apparatus according to claim 8 wherein the discharge of said eductor is connected to further means for fractionating the same which are provided and adapted to fractionate therefrom hydrocarbons unavoidably present but not desired in the reaction zone, means for removing from said last-mentioned fractionating means alkylatable hydrocarbons which are desired in said reactor and means connecting said last-mentioned fractionation means to said reactor for returning said desired alkylatable hydrocarbons to said reactor.

References Cited in the file of this patent
UNITED STATES PATENTS

| | | |
|---|---|---|
| 2,036,968 | Moore | Apr. 7, 1936 |
| 2,412,863 | Bolinger et al. | Dec. 17, 1946 |
| 2,429,205 | Jenny et al. | Oct. 21, 1947 |
| 2,768,987 | Hart | Oct. 30, 1956 |